United States Patent
Okano et al.

(10) Patent No.: US 9,459,090 B2
(45) Date of Patent: Oct. 4, 2016

(54) OPTICAL DELAY APPARATUS AND OPTICAL COHERENCE TOMOGRAPHY APPARATUS

(71) Applicant: KABUSHIKI KAISHA TOSHIBA, Tokyo (JP)

(72) Inventors: Hideaki Okano, Kanagawa (JP); Shinichi Tatsuta, Tokyo (JP); Hiroshi Hasegawa, Kanagawa (JP); Hidefumi Takamine, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 14/789,241

(22) Filed: Jul. 1, 2015

(65) Prior Publication Data
US 2016/0003606 A1  Jan. 7, 2016

(30) Foreign Application Priority Data
Jul. 4, 2014 (JP) ................. 2014-138728

(51) Int. Cl.
*G02B 17/02* (2006.01)
*G01B 9/02* (2006.01)
*G02B 26/08* (2006.01)
*G02B 13/22* (2006.01)

(52) U.S. Cl.
CPC ....... *G01B 9/02091* (2013.01); *G01B 9/02028* (2013.01); *G02B 17/023* (2013.01); *G02B 26/0816* (2013.01); *G02B 13/22* (2013.01)

(58) Field of Classification Search
CPC  G01B 9/02091; G02B 17/023; G02B 13/22; G02B 26/0816

USPC ........................................ 356/497; 359/223.1
See application file for complete search history.

(56) References Cited

U.S. PATENT DOCUMENTS

| 5,015,096 A * | 5/1991 | Kowalski .............. G01B 11/30 356/124 |
| 5,220,463 A | 6/1993 | Edelstein et al. |

(Continued)

FOREIGN PATENT DOCUMENTS

| JP | 5-173075 | 7/1993 |
| JP | 9-61298 | 3/1997 |

(Continued)

OTHER PUBLICATIONS

Takada et al.; "Range Extension in Optical Low Coherence Reflectometry Achieved by Using a Pair of Retroreflectors", Electronics Letters, vol. 31, No. 18, pp. 1565-1567, (1995).

*Primary Examiner* — Jonathan Hansen
(74) *Attorney, Agent, or Firm* — Finnegan, Henderson, Farabow, Garrett & Dunner, LLP

(57) ABSTRACT

According to one embodiment, an optical delay apparatus includes the following elements. The first retroreflector includes a first and a second reflection surface. The second retroreflector includes a third and a fourth reflection surface opposite to the first reflection surface. The third retroreflector includes a fifth and a sixth reflection surface opposite to the second reflection surface. The first driving mechanism moves the first retroreflector and a set of the second retroreflector and the third retroreflector relative to each other. The second retroreflector and the third retroreflector are misaligned with each other in a direction along a first line of intersection between the first reflection surface and the second reflection surface.

11 Claims, 8 Drawing Sheets

(56) References Cited

U.S. PATENT DOCUMENTS

| | | | |
|---|---|---|---|
| 6,356,377 B1* | 3/2002 | Bishop | G02B 6/2861 359/237 |
| 6,476,919 B1 | 11/2002 | Mori et al. | |
| 6,751,374 B2* | 6/2004 | Wu | G02B 6/264 385/147 |
| 2009/0279171 A1* | 11/2009 | Stenton | G02B 5/122 359/529 |

FOREIGN PATENT DOCUMENTS

| | | |
|---|---|---|
| JP | 3457548 | 10/2003 |
| JP | 2006-329857 | 12/2006 |
| JP | 2009-139117 | 6/2009 |
| JP | 2010-38653 | 2/2010 |

* cited by examiner

OPTICAL DELAY APPARATUS AND OPTICAL COHERENCE TOMOGRAPHY APPARATUS

CROSS-REFERENCE TO RELATED APPLICATIONS

This application is based upon and claims the benefit of priority from Japanese Patent Application No. 2014-138728, filed Jul. 4, 2014, the entire contents of which are incorporated herein by reference.

FIELD

Embodiments described herein relate generally to an optical delay apparatus and an optical coherence tomography apparatus.

BACKGROUND

Low-coherence interference measurement is a technique involving sufficient resolution to enable information such as the surface shape or thickness of a measurement target to be obtained at a scale almost equal to the wavelength of light. Tomographic information on the measurement target can be obtained using light with a wavelength at which light transmits the measurement target, and thus, low-coherence interference measurement is utilized, for example, for medical devices. An example of a medical device is an optical coherence tomography apparatus that acquires biological tomographic information. This medical device enables information other than biological tomographic information to be obtained by using a combination of low-coherence interference measurement and near-infrared spectroscopy (NIRS) or polarimetry.

Low-coherence interference measurement involves performing measurement by separating light emitted by a low-coherence light source into probe light and reference light, irradiating the measurement target with the probe light, and detecting the intensity of interference light between the reference light and the probe light reflected from the measurement target. An intensity change resulting from interference occurs when the difference in optical path length between the probe light and the reference light is equal to or smaller than the coherence length of the light source. An apparatus utilizing low-coherence interference measurement includes an optical delay apparatus that enables the optical path length of the reference light to be changed. For the optical delay apparatus, there has been a demand to enable a size reduction and an increase in optical path length.

DETAILED DESCRIPTION

Figure 1:
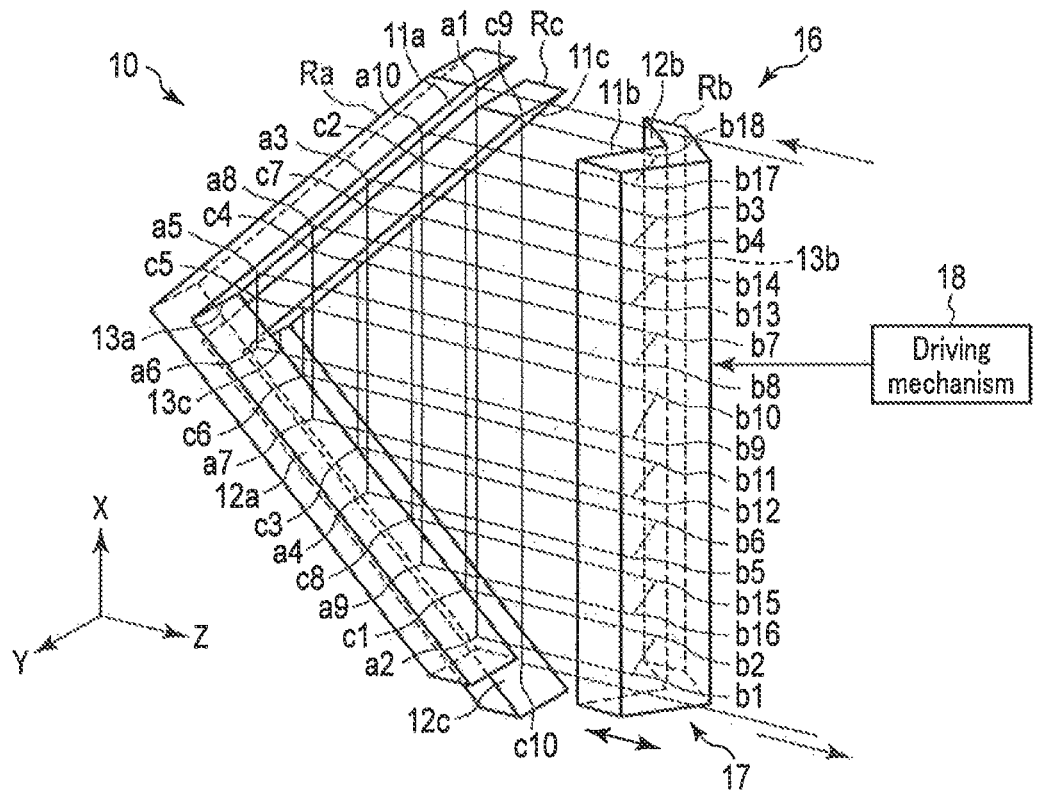
FIG. 1 is a diagram depicting an optical delay apparatus according to a first embodiment.

According to one embodiment, an optical delay apparatus includes a first retroreflector, a second retroreflector, a third retroreflector, and a first driving mechanism. The first retroreflector includes a first reflection surface and a second reflection surface which are substantially perpendicular to each other. The second retroreflector includes a third reflection surface and a fourth reflection surface which are opposite to the first reflection surface and substantially perpendicular to each other. The third retroreflector includes a fifth reflection surface and a sixth reflection surface which are opposite to the second reflection surface and substantially perpendicular to each other. The first driving mechanism moves the first retroreflector and a set of the second retroreflector and the third retroreflector relative to each other. A first line of intersection between the first reflection surface and the second reflection surface is substantially perpendicular to a second line of intersection between the third reflection surface and the fourth reflection surface, the second line of intersection is substantially parallel to a third line of intersection between the fifth reflection surface and the sixth reflection surface, and the second line of intersection and the third line of intersection are misaligned with each other in a direction along the first line of intersection.

Embodiments will be described hereinafter with reference to the drawings. In the following embodiments, like reference numerals denote like elements, and a repetitive description thereof will be omitted.

First Embodiment

Figure 2:
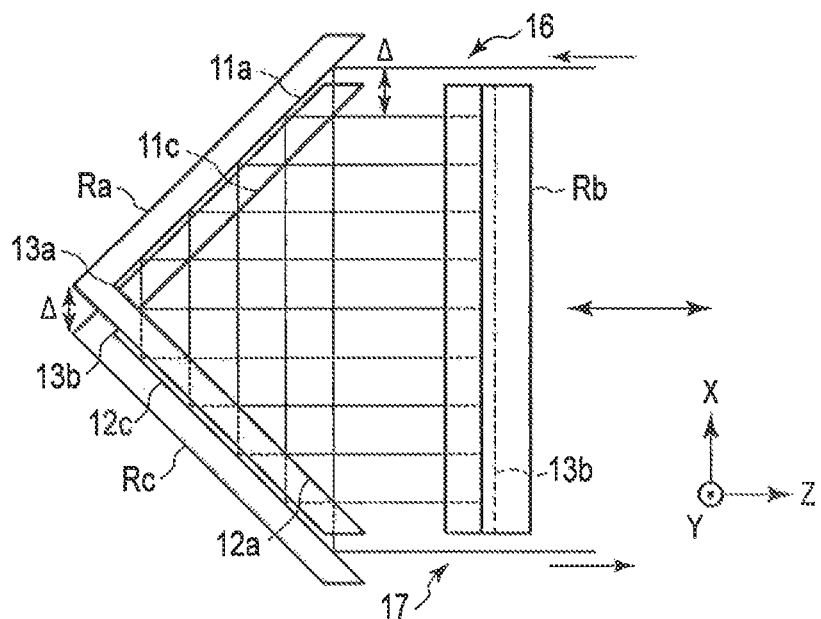
FIG. 2 is a side view depicting an arrangement of optical members included in the optical delay apparatus depicted in FIG. 1.
Figure 3:
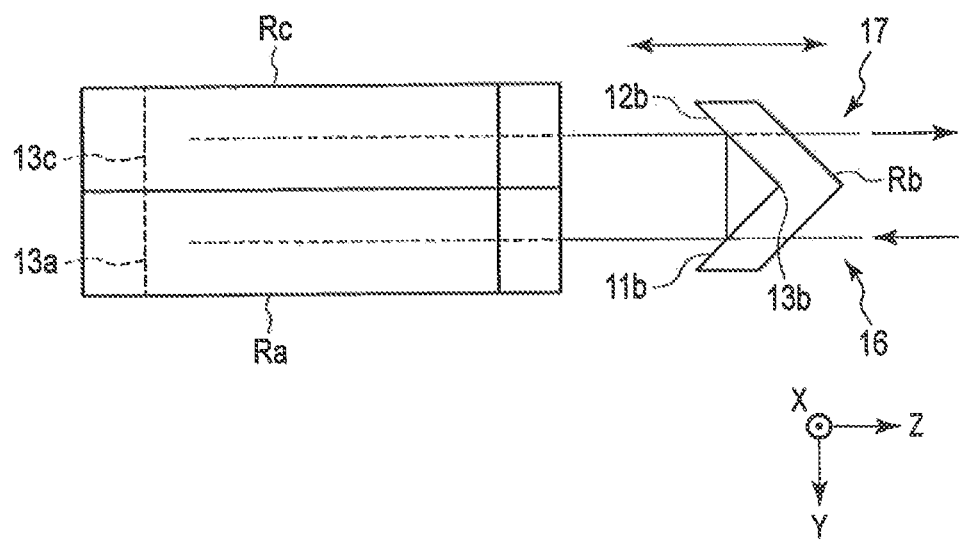
FIG. 3 is a top view depicting the arrangement of the optical members included in the optical delay apparatus depicted in FIG. 1.

FIG. 1 schematically depicts an optical delay apparatus 10 according to a first embodiment. FIG. 2 and FIG. 3 is a side view and a top view, respectively, schematically depicting an arrangement of optical members included in the optical delay apparatus 10. As depicted in FIG. 1, the optical delay apparatus 10 includes retroreflectors Ra, Rb, and Rc, and a driving mechanism 18.

The retroreflector Ra includes reflection surfaces 11a and 12a that are substantially perpendicular to each other. The retroreflector Rb includes reflection surfaces 11b and 12b that are substantially perpendicular to each other. The retroreflector Rc includes reflection surfaces 11c and 12c that are substantially perpendicular to each other. The reflection surfaces 11a, 12a, 11b, 12b, 11c, and 12c may be, for example, dielectric multilayer film mirrors or metal deposition mirrors or may utilize total reflection from a prism.

In the present embodiment, the reflection surfaces 11a, 12a, 11b, 12b, 11c, and 12c are shaped like rectangles. In the retroreflector Ra, a short side of the reflection surface 11a and a short side of the reflection surfaces 12a are connected together to form a ridge 13a. In the retroreflector Rb, a long side of the reflection surface 11b and a long side of the reflection surfaces 12b are connected together to form a ridge 13b. In the retroreflector Rc, a short side of the reflection surface 11c and a short side of the reflection surfaces 12c are connected together to form a ridge 13c. The two reflection surfaces of each of the retroreflectors Ra, Rb, and Rc may be arranged to subtend an angle of approximately 90 degrees and need not be connected together. In that case, no ridge is formed.

As depicted in FIG. 3, the retroreflector Ra is arranged in juxtaposition with the retroreflector Rc. The retroreflector Ra may or may not be mechanically coupled to the retroreflector Rc. The retroreflectors Ra and Rc are arranged opposite to the retroreflector Rb. Specifically, as depicted in FIG. 1, the reflection surfaces 11a and 12a of the retroreflector Ra are opposite to the reflection surface 11b of the retroreflector Rb. The reflection surfaces 11c and 12c of the retroreflector Rc are opposite to the reflection surface 12b of the retroreflector Rb.

The line of intersection between the reflection surface 11a and the reflection surface 12a is substantially parallel to the line of intersection between the reflection surface 11c and the reflection surface 12c and substantially perpendicular to the line of intersection between the reflection surface 11b and the reflection surface 12b. In this regard, the line of intersection between two reflection surfaces refers to a straight line along which two virtual planes including the two reflection surfaces intersect each other. The line of intersection between the reflection surface 11a and the reflection surface 12a includes the ridge 13a. The line of intersection between the reflection surface 11b and the reflection surface 12b includes the ridge 13b. The line of intersection between the reflection surface 11c and the reflection surface 12c includes the ridge 13c.

Now, to aid in the description, an xyz orthogonal coordinate system is defined. An x axis is defined as an axis parallel to the ridge 13b. A y axis is defined as an axis parallel to the ridge 13a. A z axis is defined as an axis orthogonal to the x axis and the y axis. In the present embodiment, an incident plane for the retroreflectors Ra and Rc is substantially orthogonal to the y axis. An incident plane for the retroreflector Rb is substantially orthogonal to the x axis. The incident plane refers to a virtual plane including an incident light beam and a reflected light beam. For example, a light beam traveling in the direction of the z axis is incident on the retroreflector Ra, and the light beam reflected by the retroreflector Ra travels in the direction of the z axis opposite to the direction of the incident light beam.

As depicted in FIG. 2, the retroreflectors Ra and Rc are arranged in misalignment with each other in the direction of the x axis by a distance Δ. More specifically, the line of intersection between the reflection surface 11a and the reflection surface 12a and the line of intersection between the reflection surface 11c and the reflection surface 12c are positioned in misalignment with each other by the distance Δ. The ridge 13a is positioned in misalignment with the ridge 13c in the direction of the x axis as viewed from the side. The retroreflectors Ra and Rc may be arranged in misalignment with each other in the direction of the z axis as well as in the direction of the x axis. In the example in FIG. 2, the retroreflectors Ra, Rb, and Rc have substantially the same dimension in the direction of the x axis. An upper end of the retroreflector Rb is positioned below an upper end of the retroreflector Ra and at substantially the same level as that of an upper end of the retroreflector Rc. A lower end of the retroreflector Rb is positioned above a lower end of the retroreflector Rc and at substantially the same level as that of a lower end of the retroreflector Rb.

A driving mechanism 18 moves the retroreflector Rb and a set of the retroreflectors Ra and Rc relative to each other in order to change the optical path length of a light beam passing through the optical delay apparatus 10. As the driving mechanism 18, for example, an actuator including a stepping motor and a rack pinion may be utilized.

The retroreflector Rb is opposite to the set of the retroreflectors Ra and Rc in the direction of the z axis. In the present embodiment, the driving mechanism 18 is coupled to the retroreflector Rb to move the retroreflector Rb in the direction of the z axis. When the retroreflector Rb moves in the direction of the z axis, the distance between the retroreflector Rb and the retroreflector Ra and the distance between the retroreflector Rb and the retroreflector Rc change. For example, when the retroreflector Rb moves in a direction in which the retroreflector Rb approaches the set of the retroreflectors Ra and Rc, the distance between the retroreflector Rb and the retroreflector Ra and the distance between the retroreflector Rb and the retroreflector Rc decrease, that is, the optical path lengths decrease. When the retroreflector Rb moves in a direction in which the retroreflector Rb leaves the set of the retroreflectors Ra and Rc, the distance between the retroreflector Rb and the retroreflector Ra and the distance between the retroreflector Rb and the retroreflector Rc increase, that is, the optical path lengths increase. In another embodiment, the driving mechanism 18 is coupled to the retroreflectors Ra and Rc to move the retroreflectors Ra and Rc in the direction of the z axis.

The optical delay apparatus 10 according to the present embodiment uses the driving mechanism 18 to drive the retroreflector Rb to adjust the optical path length. That is, the amount of optical delay (delay time) is controlled by driving the retroreflector Rb.

Now, operations of the optical delay apparatus 10 will be described in detail.

Referring to FIG. 1, a light beam generated by a light source not depicted in the drawings enters the retroreflector Ra through an incident port 16 provided above the retroreflector Ra. The light beam is reflected from a position a1 on a reflection surface 11a and then reflected from a position a2 on a reflection surface 12a, and travels to the retroreflector Rb at the same angle as that at which the light beam enters the retroreflector Ra. Then, the light beam is reflected from a position b1 on a reflection surface 11b and then reflected from a position b2 on a reflection surface 12b, and travels to the retroreflector Rc at the same angle as that at which the light beam enters the retroreflector Rb. Moreover, the light beam is reflected from a position c1 on a reflection surface 11c and then reflected from a position c2 on a reflection surface 12c, and travels to the retroreflector Rb at the same angle as that at which the light beam enters the retroreflector Rc. The light beam is reflected from a position b3 on a reflection surface 12b and then reflected from a position b4 on a reflection surface 11b, and enters the retroreflector Rb again at the same angle as that at which the light beam enters the retroreflector Rb.

Then, the light beam is reflected from positions a3, a4, b5, b6, c3, c4, b7, b8, a5, a6, b9, b10, c5, c6, b11, b12, a7, a8, b13, b14, c7, c8, b15, b16, a9, a10, b17, b18, c9, and c10 in this order and then exits through an exit port 17. The positions a1, a3, a5, a8, and a10 are positions on the reflection surface 11a. The positions a2, a4, a6, a7, and a9 are positions on the reflection surface 12a. The positions b1, b4, b5, b8, b9, b12, b13, b16, and b17 are positions on the reflection surface 11b. The positions b2, b3, b6, b7, b10, b11, b14, b15, and b18 are positions on the reflection surface 12b. The positions c2, c4, c5, c7, and c9 are positions on the reflection surface 11c. The positions c1, c3, c6, c8, and c10 are positions on the reflection surface 12c.

Thus, the light beam is reflected between the retroreflectors Ra and Rb and Rc multiple times in an order of Ra, Rb, Rc, Rb, Ra, Rb, Rc, . . . , Rc, and is then output through the exit port 17. In the example illustrated in FIG. 1, the light beam makes nine reciprocations between the retroreflector Rb and the set of the retroreflectors Ra and Rc. The reciprocation refers to traveling of the light beam from one of the retroreflectors Ra and Rc to the other of the retroreflectors Ra and Rc via the retroreflector Rb. Specifically, nine optical paths are formed between the retroreflector Ra and the retroreflector Rb. Nine optical paths are formed between the retroreflector Rc and the retroreflector Rb. Arranging the retroreflectors Ra and Rc in misalignment with each other in the direction of the x axis results in multiple reflections of the light beam between the retroreflectors Ra and Rb and Rc. This allows a large optical path length to be achieved.

The distance between two adjacent paths in the direction of the x axis is the distance Δ. The number of optical paths formed between the retroreflector Ra and the retroreflector Rb and the number of optical paths formed between the retroreflector Rc and the retroreflector Rb are designed in accordance with the specifications for the equipment concerned. The numbers are determined, for example, depending on the relation between the dimensions of the retroreflectors Ra, Rb, and Rc in the direction of the x axis and the amount by which the retroreflector Ra is misaligned with the retroreflector Rc in the direction of the x axis.

In the present embodiment, the driving mechanism 18 moves the retroreflector Rb to enable a significant change in the optical path length of a light beam passing through the optical delay apparatus 10. For example, when the light beam makes nine reciprocations between the retroreflector Rb and the set of the retroreflectors Ra and Rc, moving the retroreflector Rb by d [mm] in the direction of the z axis changes the optical path length by 18×d (=2×9×d) [mm]. In the conventional technique in which two retroreflectors are arranged opposite to each other, when nine optical paths are formed between the two retroreflectors, moving one of the retroreflectors by d [mm] changes the optical path length by 9×d [mm]. Thus, when the retroreflector is moved the same distance, the present embodiment allows a double change in optical path length to be effected compared to the conventional technique. Moreover, in the structure in the present embodiment, the retroreflector Rb three-dimensionally folds the optical path, enabling a reduction in the size of the apparatus in terms of area.

As described above, in the optical delay apparatus 10 according to the first embodiment, the retroreflectors Ra and Rc are arranged opposite to and in misalignment with the retroreflector Rb in a direction along the ridge 13b of the retroreflector Rb, and the driving mechanism 18 is provided which moves the retroreflector Rb relative to the set of the retroreflectors Ra and Rc. This allows a large optical path length to be achieved simply by moving the retroreflector Rb a short distance. The range over which the optical path length (delay time) can be changed can be increased with the size of the optical delay apparatus 10 kept small.

Modification of the First Embodiment

In the optical delay apparatus 10, the incident port 16 is provided above the retroreflector Rb, and the exit port 17 is provided below the retroreflector Rb. However, the incident port 16 and the exit port 17 are not limited to the example where both the incident port 16 and the exit port 17 are provided on the retroreflector Rb side. At least one of the incident and exit ports 16 and 17 may be retroreflector Ra and retroreflector Rc side.

Figure 4:
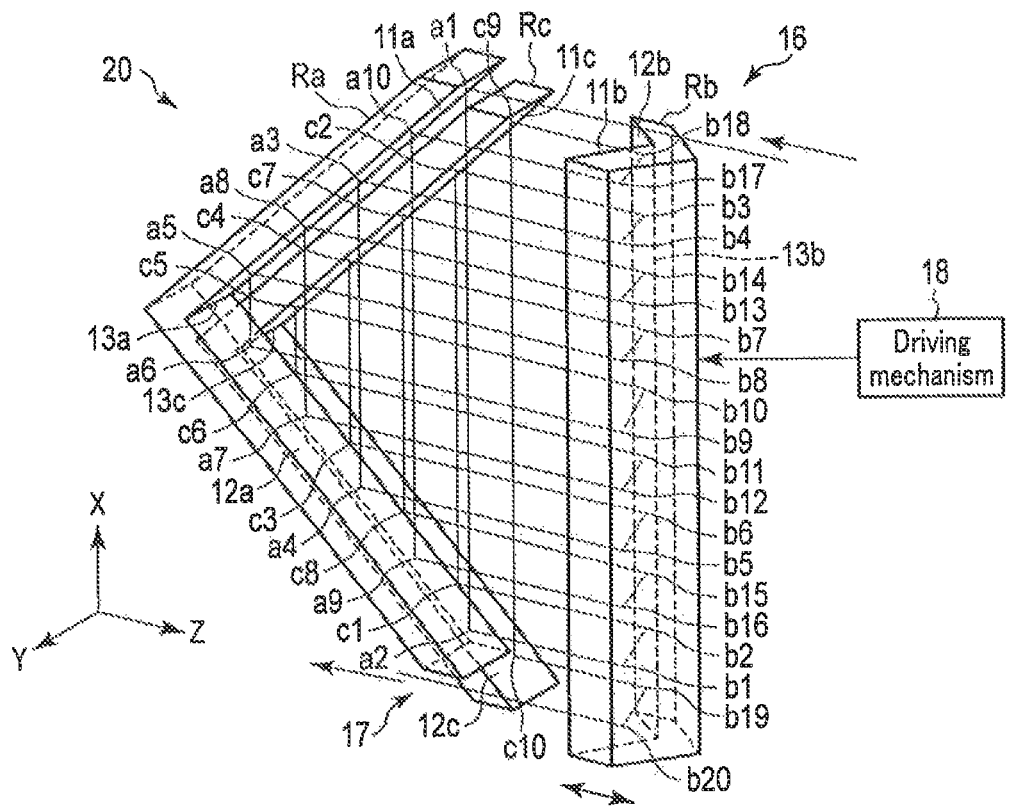
FIG. 4 is a diagram depicting an optical delay apparatus according to a first modification of the first embodiment.
Figure 5:
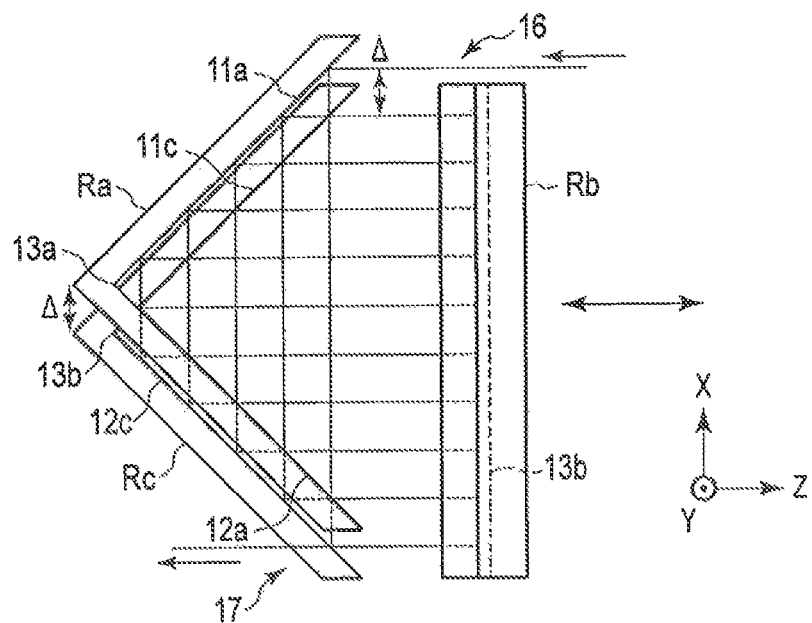
FIG. 5 is a side view depicting an arrangement of optical members included in the optical delay apparatus depicted in FIG. 4.

FIG. 4 schematically depicts an optical delay apparatus 20 according to a first modification of the first embodiment. FIG. 5 is a side view schematically depicting an arrangement of optical members included in the optical delay apparatus 20. The optical delay apparatus 20 depicted in FIG. 4 has the same basic structure as that of the optical delay apparatus 10 depicted in FIG. 1. The retroreflector Rb in the optical delay apparatus 20 is longer than the retroreflector Rb in the optical delay apparatus 10 in the direction of the x axis. Specifically, as depicted in FIG. 5, the lower end of the retroreflector Rb is positioned below the lower end of the retroreflector Ra and at substantially the same level as that of the lower end of the retroreflector Rc. In the first modification, the exit port 17 is provided below the retroreflector Ra.

Referring to FIG. 4, the optical path according to the first modification is the same as the optical path described with reference to FIG. 1 within the range from incident port 16 to the position c10 on the reflection surface 12c of the retroreflector Rc. A light beam reflected from the position c10 on the reflection surface 12b enters the retroreflector Rb again. The light beam is reflected from the position b19 on the reflection surface 12b, then reflected from the position b20 on the reflection surface 11b, and output through the exit port 17.

Figure 6:
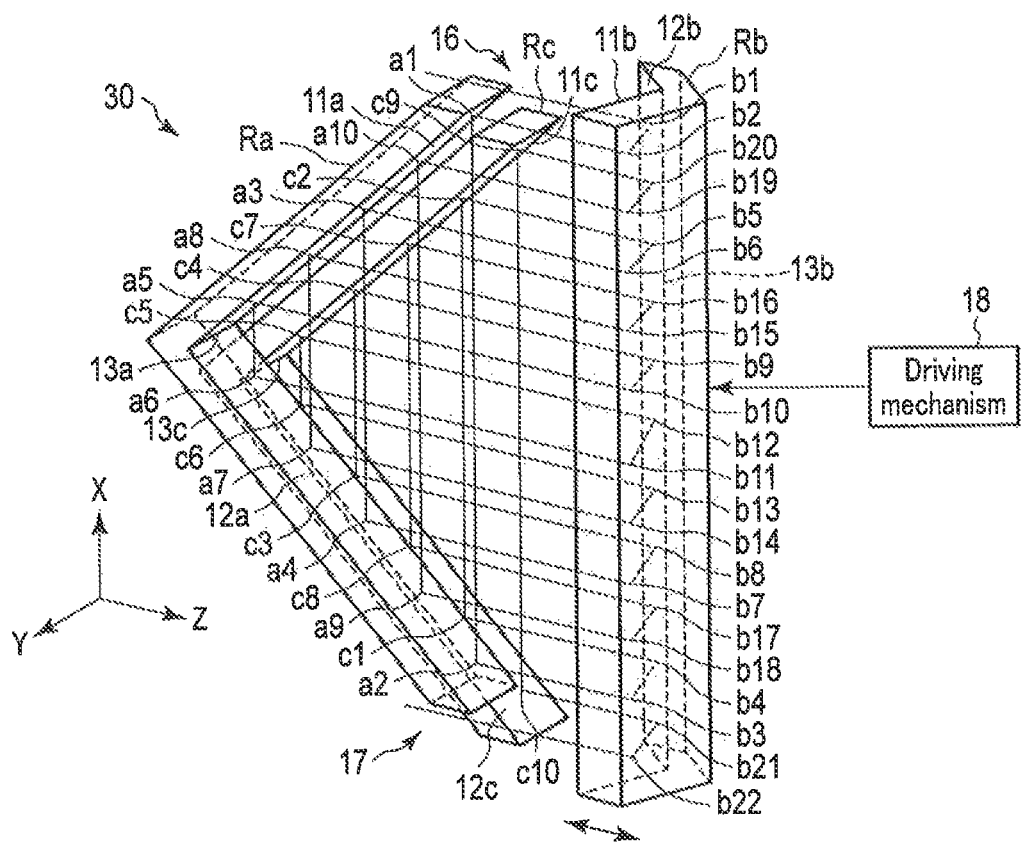
FIG. 6 is a diagram depicting an optical delay apparatus according to a second modification of the first embodiment.
Figure 7:
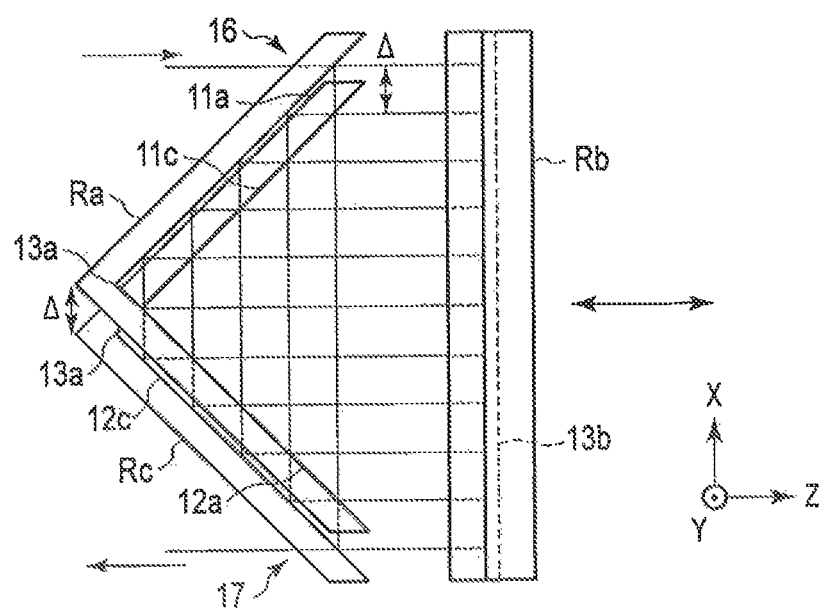
FIG. 7 is a side view depicting an arrangement of optical members included in the optical delay apparatus depicted in FIG. 6.

FIG. 6 schematically depicts an optical delay apparatus 30 according to a second modification of the first embodiment. FIG. 7 is a side view schematically depicting an arrangement of optical members included in the optical delay apparatus 30. The optical delay apparatus 30 depicted in FIG. 6 has the same basic structure as that of the optical delay apparatus 10 depicted in FIG. 1. The retroreflector Rb in the optical delay apparatus 30 is formed to be longer than the retroreflector Rb in the optical delay apparatus 10 in the direction of the x axis. Specifically, as depicted in FIG. 7, the upper end of the retroreflector Rb is positioned above the upper end of the retroreflector Rc and at substantially the same level as that of the upper end of the retroreflector Ra. The lower end of the retroreflector Rb is positioned below the lower end of the retroreflector Ra and at the same level as that of the lower end of the retroreflector Rc. In the second modification, the incident port 16 is provided above the retroreflector Rc, and the exit port 17 is provided below the retroreflector Ra.

Referring to FIG. 6, a light beam generated by a light source not depicted in the drawings enters the retroreflector Rb through the incident port 16. The light beam is reflected multiple times between the retroreflectors Ra and Rb and Rc in an order of Rb, Ra, Rb, Rc, Rb, Ra, Rb, . . . , Rb, and is output through the exit port 17. Specifically, the light beam is reflected from the positions b1, b2, a1, a2, b3, b4, c1, c2, b5, b6, a3, a4, b7, b8, c3, c4, b9, b10, a5, a6, b11, b12, c5, c6, b13, b14, a7, a5, b15, b16, c7, c8, b17, b18, a9, a10, b19, b20, c9, c10, b21, and b22 in this order and then exits through the exit port 17. The positions a1, a3, a5, a8, and a10 are positions on the reflection surface 11a. The positions a2, a4, a6, a7, and a9 are positions on the reflection surface 12a. The positions b2, b3, b6, b7, b10, b11, b14, b15, b18, b19, and b22 are positions on the reflection surface 11b. The positions b1, b4, b5, b8, b9, b12, b13, b16, b17, b20, and b21 are positions on the reflection surface 12b. The positions c2, c4, c5, c7, and c9 are positions on the reflection surface 11c. The positions c1, c3, c6, c8, and c10 are positions on the reflection surface 12c.

The optical delay apparatus 20 according to the first modification and the optical delay apparatus 30 according to the second modification, described above, allow effects similar to the effects of the optical delay apparatus 10 depicted in FIG. 1 to be exhibited.

Second Embodiment

Figure 8:
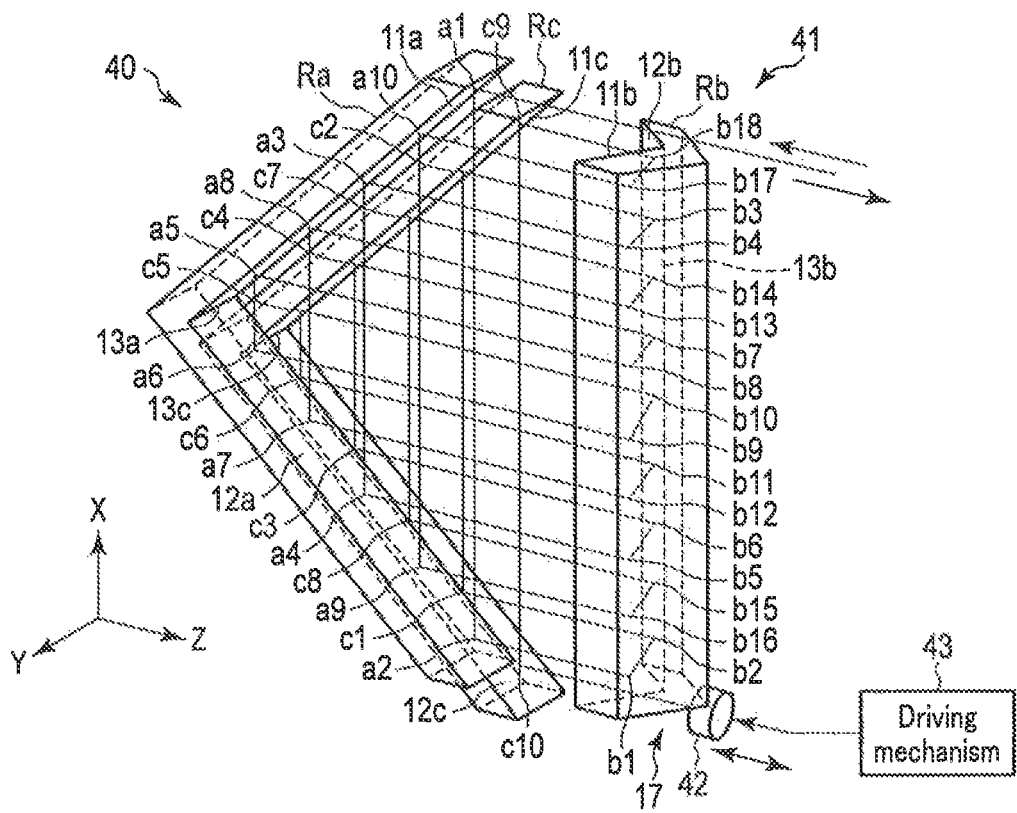
FIG. 8 is a diagram depicting an optical delay apparatus according to a second embodiment.
Figure 9:
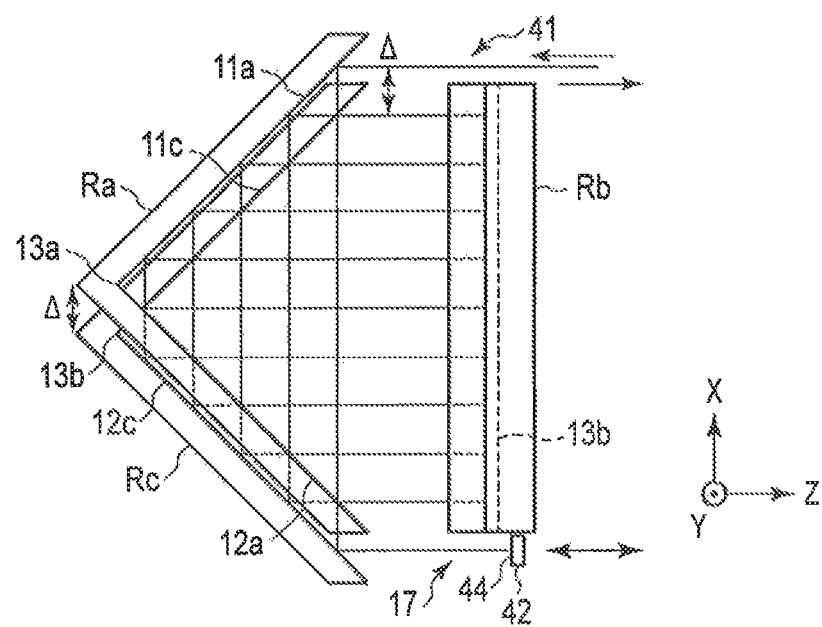
FIG. 9 is a side view depicting an arrangement of optical members included in the optical delay apparatus depicted in FIG. 8.

FIG. 8 schematically depicts an optical delay apparatus 40 according to a second embodiment. FIG. 9 is a side view schematically depicting an arrangement of optical members included in the optical delay apparatus 40. As depicted in FIG. 8, the optical delay apparatus 40 includes retroreflectors Ra, Rb, and Rc, a reflection element (also hereinafter referred to as a reflection mirror) 42, and a driving mechanism 43. The structure and arrangement of the retroreflectors Ra, Rb, and Rc are the same as the structure and arrangement described in the first embodiment and will thus not be described below. The structure and arrangement of the retroreflectors Ra, Rb, and Rc may be the same as the structure and arrangement depicted in FIG. 4 or in FIG. 6.

A reflection surface 44 of the reflection element 42 is arranged opposite to a reflection surface 12c of the retroreflector Rc as depicted in FIG. 9. The position of the reflection element 42 corresponds to the position of the exit port 17 in the optical delay apparatus 10 according to the first embodiment. A light beam reflected from a position c10 on the reflection surface 12c of the retroreflector Rc is reflected from the reflection surface 44 of the reflection element 42 and returns to the reflection surface 12c. The reflection surface 44 may be, for example, a dielectric multilayer film mirror or a metal deposition mirror or may utilize total reflection from a prism.

The driving mechanism 43 moves the reflection element 42 relative to the retroreflector Rc. The reflection element 42 is opposite to the retroreflector Rc in the direction of the z axis. The driving mechanism 43 is coupled to the reflection element 42 to move the reflection element 42 in the direction of the z axis. When the reflection element 42 moves in the direction of the z axis, the distance between the reflection element 42 and the retroreflector Rc changes. For example, when the reflection element 42 moves in a direction in which the reflection element 42 approaches the retroreflector Rc, the distance between the reflection element 42 and the retroreflector Rc decreases, that is, the optical path length decreases. When the reflection element 42 moves in a direction in which the reflection element 42 leaves the retroreflector Rc, the distance between the reflection element 42 and the retroreflector Rb increases, that is, the optical path length increases. As the driving mechanism 43, a piezo actuator may be utilized.

A light beam generated by a light source not depicted in the drawings enters the retroreflector Ra through a port 41. The light beam passes through the same optical paths as that described in the first embodiment and then enters the reflection element 42. The light beam reflected by the reflection element 42 passes through the same optical paths in the opposite direction and is then output through the port 41.

That is, the optical delay apparatus 40 in the second embodiment provides an optical path length double the optical path length in the optical delay apparatus 10 in the first embodiment which has the same volume as that of the optical delay apparatus 40.

In the second embodiment, the driving mechanism 43 moves the reflection element 42 to change the optical path length of the light beam passing through the optical delay apparatus 40. When the reflection element 42 is moved by d [mm] in the direction of the z axis, the optical path length changes by 2×d [mm]. Thus, the optical delay can be adjusted at a high resolution.

Third Embodiment

A third embodiment corresponds to a combination of the first embodiment and the second embodiment.

Figure 10:
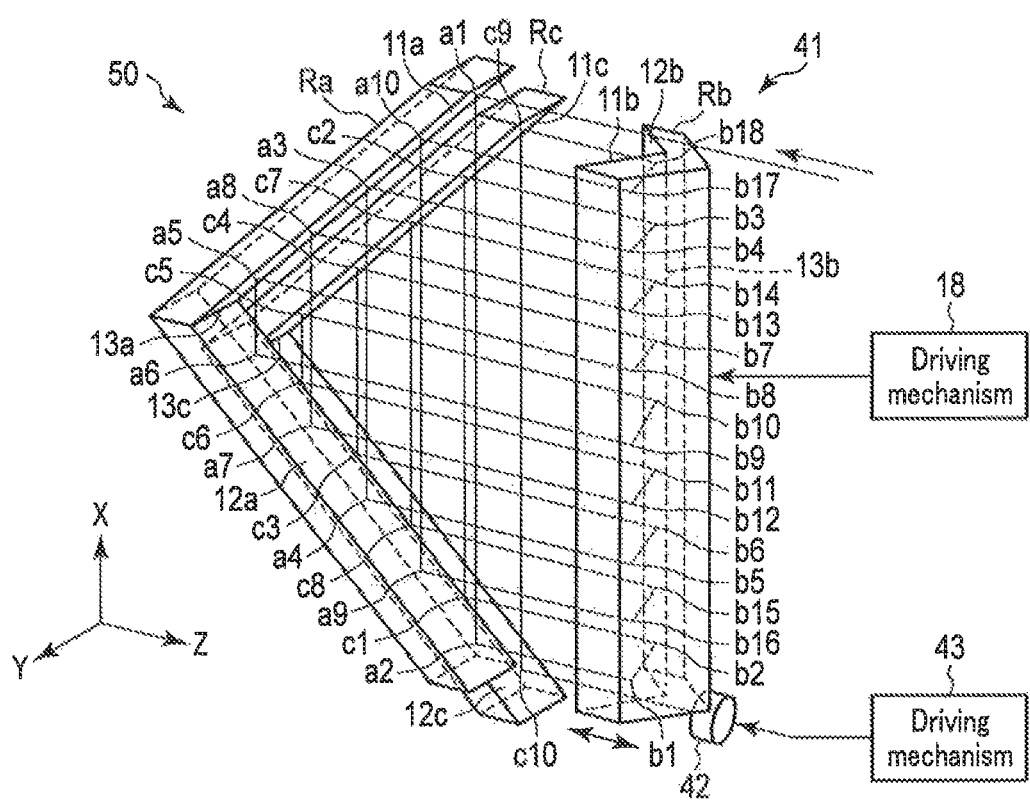
FIG. 10 is a diagram depicting an optical delay apparatus according to a third embodiment.

FIG. 10 schematically depicts an optical delay apparatus 50 according to the third embodiment. As depicted in FIG. 10, the optical delay apparatus 50 includes retroreflectors Ra, Rb, and Rc, a reflection element 42, a driving mechanism 18, and a driving mechanism 43. The structure and arrangement of the retroreflectors Ra, Rb, and Rc are the same as the structure and arrangement described in the first embodiment and will thus not be described below. The structure and arrangement of the retroreflectors Ra, Rb, and Rc may be the same as the structure and arrangement depicted in FIG. 4 or in FIG. 6.

In the third embodiment, the retroreflector Rb is driven by the driving mechanism 18, and moreover, the reflection element 42 is driven by the driving mechanism 43 to change the optical path length of a light beam passing through the optical delay apparatus 50. When nine optical paths are formed between the retroreflector Ra and the retroreflector Rb and nine optical paths are formed between the retroreflector Rc and the retroreflector Rb, moving the retroreflector Rb by d1 [mm] in the direction of the z axis changes the optical path length by 36×d1 (=2×18×d1) [mm]. The reflection element 42 reflects one light beam, and thus, moving the reflection element 42 by d2 [mm] in the direction of the z axis changes the optical path length by 2×d2 [mm]. That is, driving the retroreflector Rb allows the optical path length to be roughly adjusted, and driving the reflection element 42 allows the optical path length to be fine-tuned. The amount of optical delay can be significantly changed and adjusted at a high resolution.

Fourth Embodiment

In a fourth embodiment, an example of an apparatus utilizing an optical delay apparatus will be described.

Figure 11:
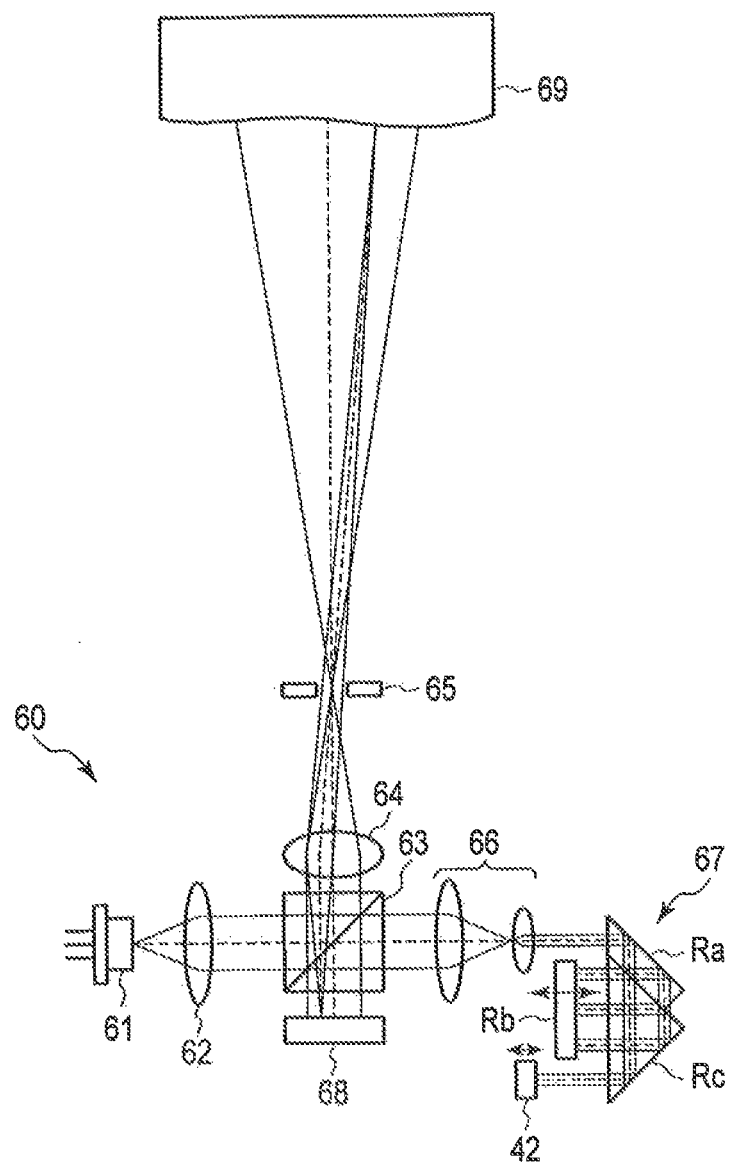
FIG. 11 is a diagram depicting an optical coherence tomography apparatus according to a fourth embodiment.

FIG. 11 schematically depicts an optical coherence tomography (OCT) apparatus 60. As depicted in FIG. 11, the optical coherence tomography apparatus 60 includes a light source 61, a collimator lens 62, a beam splitter 63, an objective lens 64, a diaphragm 65, a beam expander 66 serving as a beam diameter converter, an optical delay apparatus 67, and an image sensor 68. The optical delay apparatus 67 may be one of the above-described optical delay apparatuses or modifications thereof. The optical delay apparatus 67 in the present embodiment has the same structure as that of the optical delay apparatus 50 according to the third embodiment. Specifically, the optical delay apparatus 67 includes retroreflectors Ra, Rb, and Rc, a reflection element 42, a driving mechanism 18, and a driving mechanism 43. In FIG. 11, the driving mechanism 18 and the driving mechanism 43 are omitted.

The light source 61 is a low-coherence light source. For example, the light source 61 includes a superluminescent diode (SLD) with a near infrared wavelength. A light beam emitted by the light source 61 is converted into a parallel light beam by the collimator lens 62, and the parallel light beam enters the beam splitter 63. The beam splitter 63 splits the incident light beam into two branch light beams. One of the branch light beams is directed to the objective lens 64 as probe light. The probe light having passed through the objective lens 64 is applied to a measurement target 69 via the diaphragm 65. The diaphragm 65 is arranged between the objective lens 64 and the measurement target 69 near the focal distance of the objective lens 64.

The probe light is reflected or scattered by the measurement target 69 and passes through the objective lens 64 again. The effect of the diaphragm 65 makes the objective lens 64 image-side telecentric. Thus, the probe light spreads with respect to the measurement target 69 and allows a laterally wide area to be measured. Furthermore, for the image side (light receiving side), a principal light beam of light scattered by a certain point on the measurement target 69 is substantially parallel to a principal light beam of outward path light (probe light entering the measurement target 69), and enters the beam splitter 63 and reaches the image sensor 68 to form an image of the measurement target 69 on the image sensor 68.

The other of the branch light beam is directed to the beam expander 66 as reference light. The beam expander 66 has a magnifying power of 1 or less to convert the light spread by the collimator lens 62 into thin parallel light. The reference light converted into the parallel light with a small diameter enters the optical delay apparatus 67 and is reflected by the reflection element 42 and returns through the same path. The reference light having returned passes, in the opposite direction, through the beam expander 66 saving as a beam diameter convertor. Thus, the beam diameter of the reference light is increased, and the resultant reference light enters the beam splitter 63. The reference light is reflected by the beam splitter 63 and enters the image sensor 68 while remaining parallel light. The beam splitter 63 functions as a beam splitting optical element that splits light from the light source 61 into the probe light and the reference light and also as a beam combining optical element that combines the probe light reflected or scattered by the measurement target 69 and the reference light delayed by the optical delay apparatus 67.

When the difference between the optical path length of the probe light and the optical path length of the reference light is equal to or smaller than the coherence length of the light source 61, the degree of coherence increases, and the intensity is changed by interference. Thus, the distance to the measurement target 69 can be measured at least at an accuracy equivalent to the coherence length of the light source 61.

In the present embodiment, since the objective lens 64 is image-side telecentric, the principal light beam direction of the reference light is the same as the principal light beam direction of the probe light all over the image sensor 68. Normally, a change in light beam direction reduces an intensity contrast associated with interference and thus an SN ratio (signal-to-noise ratio). An optical system in the present embodiment suppresses a decrease in intensity contrast particularly in a peripheral portion of the image sensor 68, thus enabling a variation in interference intensity change to be restricted.

Figure 12:
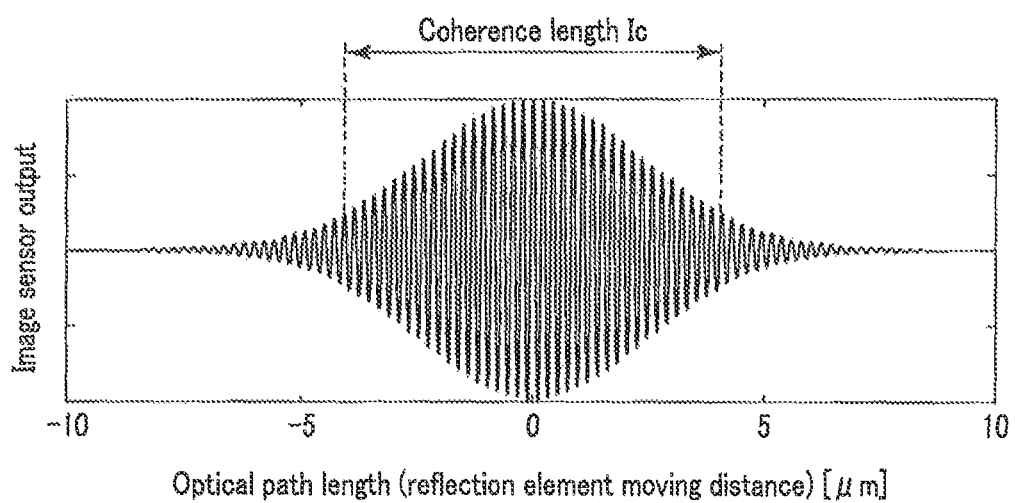
FIG. 12 is a diagram illustrating the relation between an optical path length difference and a light intensity change.

Changes in intensity resulting from interference are measured by changing the optical path length of the reference light. For changes in optical path length, micro-changes are made to the reflection element 42 using the driving mechanism 43 (FIG. 10), for example, a piezo actuator. Then, different interferograms for respective pixels in the image sensor 68 are obtained. FIG. 12 depicts a simulated interferogram obtained when the light source 61 has a central wavelength $\lambda_0$ of 0.850 [μm] and a wavelength bandwidth $\Delta\lambda$ of 0.040 [μm]. An optical path length difference resulting in an intensity change caused by interference is determined by the coherence length lc of the light source 61. For the above-described light source 61, the coherence length lc is determined as follows.

$$l_c = 2\ln 2 \lambda_0^2/(\pi \Delta \lambda)$$
$$= 2\ln 2 \times 0.85^2/(\pi \times 0.04)$$
$$= 7.97 \ [\mu m]$$

When the optical path length difference is equal to or smaller than the coherence length lc, an intensity distribution is changed by interference as depicted in FIG. 12. This indicates that the optical path length of the reference light obtained when an envelope for intensity distribution changes resulting from interference exhibits a maximum value is equal to the optical path length of the measurement target to a reflection point or a scattering point. For the OCT apparatus 60 in the present embodiment, determining an interferogram envelope for each pixel allows measurement of the distance to the measurement target 69 for each pixel. Furthermore, when the probe light is scattered inside the measurement target 69, the internal structure of the measurement target 69 can be imaged. A depth-wise measurement range corresponds to the variable range of the optical path length of the reference light. In general, no actuator can offer both a high resolution and a long driving range. For example, a piezo actuator provides a high resolution but has a driving distance of at most several millimeters. When only the reflection element 42 is driven, the depth-wise measurement range is precluded from being increased to or above the driving distance of the actuator. In the present embodiment, the retroreflector Rb and the set of the retroreflectors Ra and Rc are moved relative to each other to enable an increase in the depth-wise measurement range.

Figure 13A:
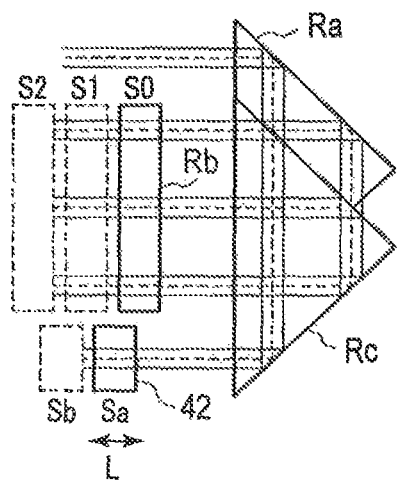
FIG. 13A and FIG. 13B are diagrams illustrating operations of the optical coherence tomography apparatus depicted in FIG. 11.
Figure 13B:
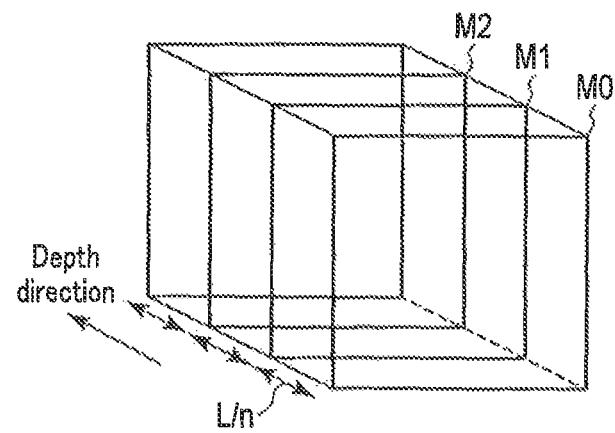

A measurement method using the OCT apparatus 60 will be described with reference to FIGS. 13A and 13B. FIG. 13A is a schematic diagram of the optical delay apparatus 67 in FIG. 11. FIG. 13B is a schematic diagram illustrating the measurement on the measurement target 69. The measurement target 69 is assumed to have a refractive index n. The retroreflector Rb is driven by the driving mechanism 18 (not depicted in FIG. 13A), for example, an actuator including a stepping motor and a rack and pinion. As described in the third embodiment, the reflection element 42 reflects one light beam, whereas the retroreflector Rb reflects a plurality of light beams. This enables a significant change in optical path length with respect to the moving distance of the retroreflector Rb. For example, as depicted in FIG. 10, when the retroreflector Rb reflects nine light beams, the optical path length changes by 36×d1 [mm] with respect to a moving distance d1 [mm].

First, it is assumed that the optical path length of the reference light obtained when the retroreflector Rb is located at a position S0 and the reflection element 42 is located at a position Sa is equal to the optical path length of the probe light reflected or scattered from a surface M0 of the measurement target 69. In this state, the reflection element 42 is moved a distance L to a position Sb, while interferograms of the reference light and the probe light are obtained using the image sensor 68. When the reflection element 42 is assumed to be located in an atmosphere with a refractive index of 1, the optical path length of the reference light changes by 2×L for a reciprocation. Since the measurement target 69 has the refractive index n, the optical path length to a surface M1 at a distance L/n from the surface M0 in FIG. 13B in the depth direction is the same as the optical path length of the reference light. In other words, the reflection element 42 is driven to allow interferograms to be obtained between the surfaces M0 and M1, thus enabling the shape or structure of the measurement target to be determined based on the interferograms.

Then, the reflection element 42 is returned to the position Sa, and the retroreflector Rb is moved from the position S0 to the position S1. When the distance between the position S0 and the position S1 is, for example, L/36, the optical path length difference between the probe light and reference light reflected from the surface M0 is 2×L/n. The surface M1 on the measurement target 69 is an equal-optical-path-length surface with respect to the position S1. In this state, the reflection element is moved the distance L from the position Sa to the position Sb, while interferograms are obtained as described above. This allows determination of the structure of the measurement target 69 from the surface M1 to the surface M2, located at the distance L/n from the surface M1 in the depth direction. This operation is repeatedly performed to acquire information on the depth direction over a measurement range much longer than the moving distance L of the reflection element 42.

The above-described method is an example where the reflection element 42 is driven to allow interferograms to be obtained and where the retroreflector Rb is driven to widen the depth-wise measurement range. The above-described method is not intended to limit the direction and order in which the reflection element 42 is moved or the number of light beams reflected by the retroreflector Rb.

The above-described embodiment is an example of what is called a time domain scheme in which the optical path length of the reference light is changed over time to allow interferograms to be obtained. However, the above-described embodiment is also applicable to Fourier domain optical coherence tomography. In the Fourier domain scheme, the reflection element 42 is not driven, but information on the depth direction is obtained by analyzing the spectrum of interference light between the reference light and the probe light, specifically, performing Fourier transform on the spectrum. OCT using a wideband light source as the light source 61 is referred to as spectral domain OCT. OCT using a wavelength sweeping light source as the light source 61 is referred to as wavelength sweeping OCT.

As described above, in the OCT apparatus 60 according to the fourth embodiment, the retroreflector Rb and reflection element 42 in the optical delay apparatus 67 are driven to allow a substantial increase in the depth-wise measurement range, while enabling the apparatus to be miniaturized.

Examples of apparatuses utilizing the optical delay apparatus according to any of the embodiments include, in addition to OCT apparatuses, for example, general interferometers and Fourier-transform infrared spectrometers (FTIRs).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical delay apparatus comprising:
   a first retroreflector with a first reflection surface and a second reflection surface which are substantially perpendicular to each other;
   a second retroreflector with a third reflection surface and a fourth reflection surface which are opposite to the first reflection surface and substantially perpendicular to each other;
   a third retroreflector with a fifth reflection surface and a sixth reflection surface which are opposite to the second reflection surface and substantially perpendicular to each other; and
   a first driving mechanism which moves the first retroreflector and a set of the second retroreflector and the third retroreflector relative to each other,
   wherein a first line of intersection between the first reflection surface and the second reflection surface is substantially perpendicular to a second line of intersection between the third reflection surface and the fourth reflection surface, the second line of intersection is substantially parallel to a third line of intersection between the fifth reflection surface and the sixth reflection surface, and the second line of intersection and the third line of intersection are misaligned with each other in a direction along the first line of intersection.

2. The optical delay apparatus according to claim 1, wherein the first driving mechanism moves the first retroreflector in a direction substantially perpendicular to the first line of intersection and the second line of intersection.

3. The optical delay apparatus according to claim 1, wherein the first driving mechanism moves the second retroreflector and the third retroreflector in a direction substantially perpendicular to the first line of intersection and the second line of intersection.

4. The optical delay apparatus according to claim 1, further comprising:
   a reflection element with a seventh reflection surface opposite to one of the first to sixth reflection surfaces; and
   a second driving mechanism which moves the reflection element relative to the one of the first to sixth reflection surfaces.

5. The optical delay apparatus according to claim 4, wherein the second driving mechanism moves the reflection element in a direction substantially perpendicular to the first line of intersection and the second line of intersection.

6. An optical delay apparatus comprising:
   a first retroreflector with a first reflection surface and a second reflection surface which are substantially perpendicular to each other;
   a second retroreflector with a third reflection surface and a fourth reflection surface which are opposite to the first reflection surface and substantially perpendicular to each other;
   a third retroreflector with a fifth reflection surface and a sixth reflection surface which are opposite to the second reflection surface and substantially perpendicular to each other;

a reflection element with a seventh reflection surface opposite to one of the first to sixth surfaces; and a driving mechanism which moves the reflection element relative to the one of the first to sixth surfaces, wherein a first line of intersection between the first reflection surface and the second reflection surface is substantially perpendicular to a second line of intersection between the third reflection surface and the fourth reflection surface, the second line of intersection is substantially parallel to a third line of intersection between the fifth reflection surface and the sixth reflection surface, and the second line of intersection and the third line of intersection are misaligned with each other in a direction along the first line of intersection.

7. The optical delay apparatus according to claim 6, wherein the driving mechanism moves the reflection element in a direction substantially perpendicular to the first line of intersection and the second line of intersection.

8. An optical coherence tomography apparatus comprising:
   a light source which generates a light beam;
   a beam splitting optical element which splits the light beam into a first branch light beam and a second branch light beam;
   an optical system which applies the first branch light beam to a measurement target;
   the optical delay apparatus according to claim 1 which delays the second branch light beam;
   a beam combining optical element which combines the first branch light beam reflected or scattered from the measurement target and the second branch light beam delayed by the optical delay apparatus to obtain a combined light beam; and
   a detector which detects a change in intensity of the combined light beam.

9. The optical coherence tomography apparatus according to claim 8, wherein
   the optical system comprises an image-side-telecentric objective lens, and
   the detector comprises an image sensor which images the combined light.

10. An optical coherence tomography apparatus comprising:
    a light source which generates a light beam;
    a beam splitting optical element which splits the light beam into a first branch light beam and a second branch light beam;
    an optical system which applies the first branch light beam to a measurement target;
    the optical delay apparatus according to claim 6 which delays the second branch light beam;
    a beam combining optical element which combines the first branch light beam reflected or scattered from the measurement target and the second branch light beam delayed by the optical delay apparatus to obtain a combined light beam; and
    a detector which detects a change in intensity of the combined light beam.

11. The optical coherence tomography apparatus according to claim 10, wherein
    the optical system comprises an image-side-telecentric objective lens, and
    the detector comprises an image sensor which images the combined light.

* * * * *